United States Patent
Kammath et al.

(10) Patent No.: US 11,334,461 B2
(45) Date of Patent: *May 17, 2022

(54) DISTRIBUTED APPLICATION RESOURCE DETERMINATION BASED ON PERFORMANCE METRICS

(71) Applicant: VMWARE, INC., Palo Alto, CA (US)

(72) Inventors: V Vimal Das Kammath, Bangalore (IN); Zacharia George, Bangalore (IN); Vipul Chaudhary, Bangalore (IN); Madhan Sankar, Bangalore (IN); Mahesh Voleti, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 16/794,273

(22) Filed: Feb. 19, 2020

(65) Prior Publication Data
US 2021/0182165 A1    Jun. 17, 2021

(30) Foreign Application Priority Data
Dec. 12, 2019   (IN) .............................. 201941051491

(51) Int. Cl.
*G06F 11/30*   (2006.01)
*G06F 11/34*   (2006.01)
*G06F 9/455*   (2018.01)

(52) U.S. Cl.
CPC ........ *G06F 11/302* (2013.01); *G06F 9/45558* (2013.01); *G06F 11/3466* (2013.01);
(Continued)

(58) Field of Classification Search
CPC .............. G06F 11/302; G06F 9/45558; G06F 11/3466; G06F 2009/45591; G06F 2009/45595; G06F 11/3006; G06F 11/3051; G06F 11/323; G06F 11/3409; G06F 2201/865
See application file for complete search history.

(56) References Cited

U.S. PATENT DOCUMENTS

| 7,711,573 B1 * | 5/2010 | Obeid ................ G06Q 10/1053 705/321 |
| 8,447,851 B1 * | 5/2013 | Anderson ........... G06F 11/3495 709/223 |

(Continued)

*Primary Examiner* — Michael A Keller

(57) ABSTRACT

In one example, a system may include an application monitoring server and an endpoint in communication with the application monitoring server. Example endpoint may include an agent to collect performance metrics associated with a program running in the endpoint and a discovery unit in communication with the agent. The discovery unit may include a metric parser to receive the performance metrics in a source format and parse the received performance metrics. Further, the discovery unit may include a resource extractor to apply a transformation definition to the parsed performance metrics to determine a plurality of resources in a destination format. The plurality of resources may be associated with an application being executed in the endpoint. Furthermore, the discovery unit may include a transmitting unit to transmit the performance metrics and first information associated with the plurality of resources to the application monitoring server via a network.

25 Claims, 8 Drawing Sheets

(52) U.S. Cl.
CPC .............. *G06F 2009/45591* (2013.01); *G06F 2009/45595* (2013.01)

(56) References Cited

U.S. PATENT DOCUMENTS

| | | | |
|---|---|---|---|
| 9,935,830 B1* | 4/2018 | Mahapatra | H04L 41/0816 |
| 10,636,086 B2* | 4/2020 | Goyal | G06Q 40/02 |
| 2006/0294221 A1* | 12/2006 | Graupner | H04L 43/067 |
| | | | 709/224 |
| 2016/0301739 A1* | 10/2016 | Thompson | G06F 9/547 |

\* cited by examiner

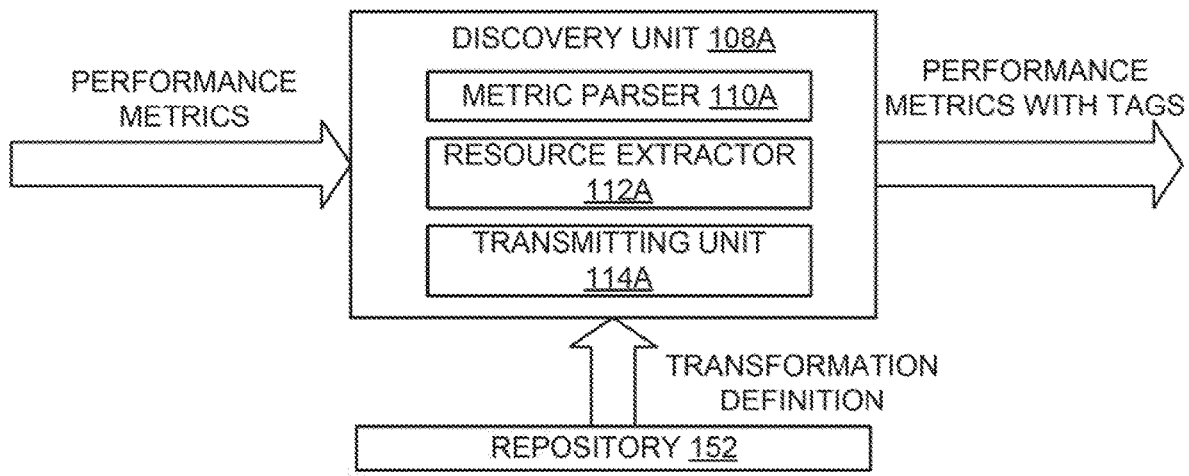

FIG. 1B

```
MSSQL.Rows--reads-sec.tempdb 41064 serverName="WIN-MSSQL"
type="DatabaseIO" source="my_win_2016"

MSSQL.Rows--reads-sec.ReportServerTempDB 3276 serverName="WIN
MSSQL" type="DatabaseIO" source="my_win_2016"

MSSQL.Rows--reads-sec.model 2503 serverName="WIN-MSSQL"
type="DatabaseIO" source="my_win_2016"

MSSQL.Rows--reads-sec.ReportServer 2650 serverName="WIN-MSSQL"
type="DatabaseIO" source="my_win_2016"

MSSQL.Rows--reads-sec.master 1075 serverName="WIN-MSSQL"
type="DatabaseIO" source="my_win_2016"

MSSQL.Rows--reads-sec.msdb 749 serverName="WIN-MSSQL"
type="DatabaseIO" source="my_win_2016"

MSSQL.Rows--writes-sec.tempdb 52064 serverName="WIN-MSSQL"
type="DatabaseIO" source="my_win_2016"

MSSQL.Rows--writes-sec.ReportServerTempDB 3564 serverName="WIN-
MSSQL" type="DatabaseIO" source="my_win_2016"

MSSQL.Rows--writes-sec.model 2768 serverName="WIN-MSSQL"
type="DatabaseIO" source="my_win_2016"
```

FIG. 2A

```
Metrics" : {
    {
        "name": "MSSQL.Rows-writes-sec-"          ← 204B
        "fields" : {
            "tempdb": 41064,
            "ReportServerTempDB": 3276,
            "model": 2503,
            "ReportServer": 2560,
            "master": 1075,
            "msdb": 749,
        }
        "tags": {
            "host": 41064,
            "servername": "WIN—MSSLQL,
            "type": "DatabaseIO",
            "vc_uuid": "419d2d2b—7c45-4acl-9df9-345778584d48",
            "vmmor": "vm--46",
        }
        "timestamp": 749,
    }
    {
        "name": "MSSQL.Rows-reads-sec-"           ← 202B
        "fields" : {
            "tempdb": 52064,
            "ReportServerTempDB": 3564,
            "model": 2768,
            "ReportServer": 2654,
            "master": 1000,
            "msdb": 876,
        }
        "tags": {
            "host": 41064,
            "servername": "WIN—MSSLQL,
            "type": "DatabaseIO",
            "vc_uuid": "419d2d2b—7c45-4acl-9df9-345778584d48",
            "vmmor": "vm--46",
        }
        "timestamp": 749,
    }
}
```

FIG. 2B — 200B

```
<?xml version="1.0" encoding="UTF-8"?>
<TransformationDefs delimiter=": :">
    <ResourceDefinition kind="MSSQLSERVERINSTANCE" name="{tags: :servername}" prefic="MSSQL">                    ⟵ 206
        <ResourceIdentifier key="host" value="{tags: :host}" />
        <ResourceIdentifier key="servername" value="{tags: : servername}" />
        <AttributeDefinition key="PERFORMANCE | Rows—reads-sec"  ⟵ 208
filterBy= "name" filterValue= "MSQL.Rows—reads-sec-"value="name_subsrt: : MSSQL.Rows—reads-sec-{}" />
        <AttributeDefinition key="PERFORMANCE | Rows—writes-sec"  ⟵ 210
filterBy= "name" filterValue= "MSSQL.Rows—writes-sec-" value="name_subsrt: :MSSQL.Rows == writes-sec-{}" />
    </ResourceDefinition>
</TransformationDefs>
```

FIG. 2C

```
MSSQL.PERFORMANCE|Rows--writes-sec-.tempdb                    41064
serverName="WIN-MSSQL"  type="DatabaseIO"  resourceID="11111111"
source="my_win_2016"
MSSQL.PERFORMANCE|Rows--writes-sec-.ReportServerTempDB        3276
serverName="WIN-MSSQL"  type="DatabaseIO"  resourceID="22222222"
source="my_win_2016"
MSSQL.PERFORMANCE|Rows--writes-sec-.model                     2503
serverName="WIN-MSSQL"  type="DatabaseIO"  resourceID="33333333"
source="my_win_2016"
MSSQL.PERFORMANCE|Rows--writes-sec-.ReportServer              2560
serverName="WIN-MSSQL"  type="DatabaseIO"  resourceID="44444444"
source="my_win_2016"
MSSQL.PERFORMANCE|Rows--writes-sec-.master                    1075
serverName="WIN-MSSQL"  type="DatabaseIO"  resourceID="55555555"
source="my_win_2016"
MSSQL.PERFORMANCE|Rows--writes-sec-.msdb  749  serverName="WIN-
MSSQL"         type="DatabaseIO"         resourceID="66666666"
source="my_win_2016"
MSSQL.PERFORMANCE|Rows--writes-sec-.tempdb                    52064
serverName="WIN-MSSQL"  type="DatabaseIO"  resourceID="11111111"
source="my_win_2016"
MSSQL.PERFORMANCE|Rows--reads-sec-.ReportServerTempDB         3564
serverName="WIN-MSSQL"  type="DatabaseIO"  resourceID="22222222"
source="my_win_2016"
MSSQL.PERFORMANCE|Rows--reads-sec-.model                      2768
serverName="WIN-MSSQL"  type="DatabaseIO"  resourceID="33333333"
source="my_win_2016"
MSSQL.PERFORMANCE|Rows--reads-sec-.ReportServer               2654
serverName="WIN-MSSQL"  type="DatabaseIO"  resourceID="44444444"
source="my_win_2016"
```

FIG. 2D

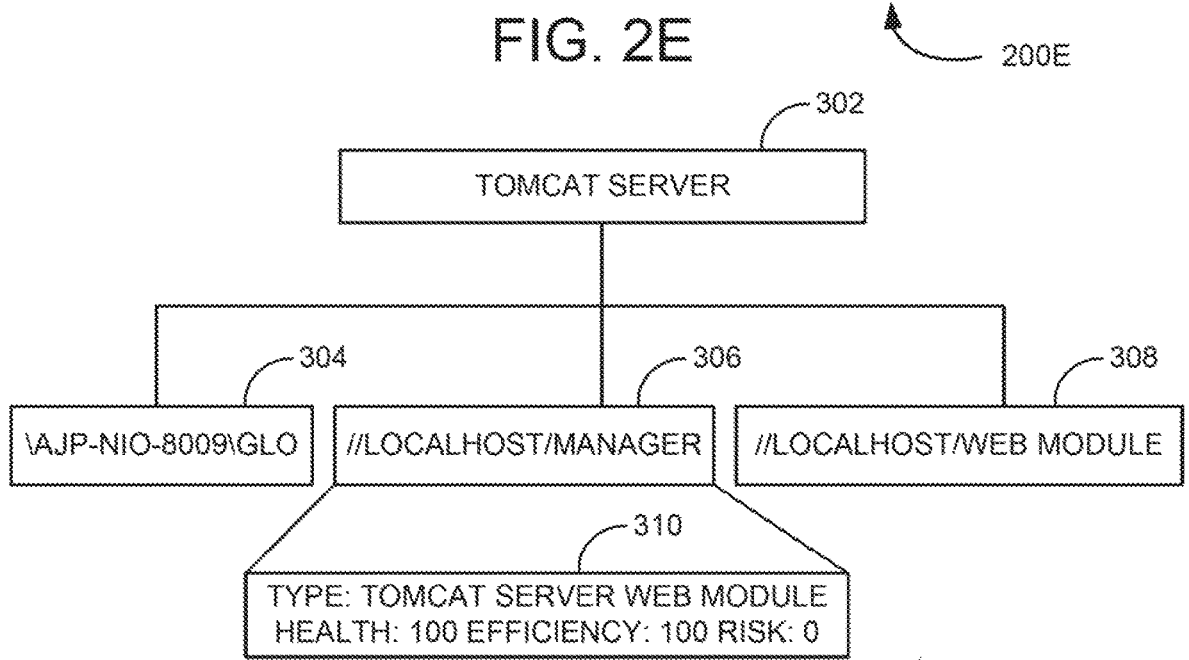

DISTRIBUTED APPLICATION RESOURCE DETERMINATION BASED ON PERFORMANCE METRICS

RELATED APPLICATIONS

Benefit is claimed under 35 U.S.C. 119(a)-(d) to Foreign Application Serial No. 201941051491 filed in India entitled "DISTRIBUTED APPLICATION RESOURCE DETERMINATION BASED ON PERFORMANCE METRICS", on Dec. 12, 2019, by VMWARE, INC., which is herein incorporated in its entirety by reference for all purposes.

The present application is related in subject matter to U.S. patent application Ser. No. 16/794,267, which is incorporated herein by reference.

TECHNICAL FIELD

The present disclosure relates to computing environments, and more particularly to methods, techniques, and systems for determining application resources at endpoints based on performance metrics of an application.

BACKGROUND

In computing environments, such as networked computing environments, cloud computing environments, virtualized environments, and the like, different applications may be executed on endpoints. Example endpoint may be a physical computer system, a workload, and the like. In an example virtualized environment, multiple physical computer systems (e.g., host computing systems) may execute different workloads such as virtual machines, containers, and the like running therein. Computer virtualization may be a technique that involves encapsulating a representation of a physical computing machine platform into a virtual machine that may be executed under the control of virtualization software running on hardware computing platforms. The hardware computing platforms may also be referred as the host computing systems or servers. A virtual machine can be a software-based abstraction of the physical computer system. Each virtual machine may be configured to execute an operating system (OS), referred to as a guest OS, and applications. A container may be a data computer node that runs on top of a host OS without the need for a hypervisor or separate OS. Further, the applications running on the endpoints may be monitored to provide performance metrics (e.g., application metrics, operating system metrics, and the like) in real time to detect and diagnose issues.

BRIEF DESCRIPTION OF THE DRAWINGS

FIG. 1B is an example block diagram of the discovery unit of FIG. 1A, depicting additional features;

FIG. 2A shows example performance metrics in wavefront format, in accordance with examples described herein;

FIG. 2B shows example performance metrics in JavaScript Object Notation (JSON) format, in accordance with examples described herein;

FIG. 2C shows an example transformation definition, in accordance with examples described herein;

FIG. 2D shows the example performance metrics of FIG. 2A, illustrating a plurality of tags including information associated with the application resources;

FIG. 2E shows the example performance metrics of FIG. 2A, illustrating a plurality of tags including information associated with hierarchical relationships between the application resources;

FIG. 3 illustrates an example representation of determined application resources associated with an application;

Figure 1A:
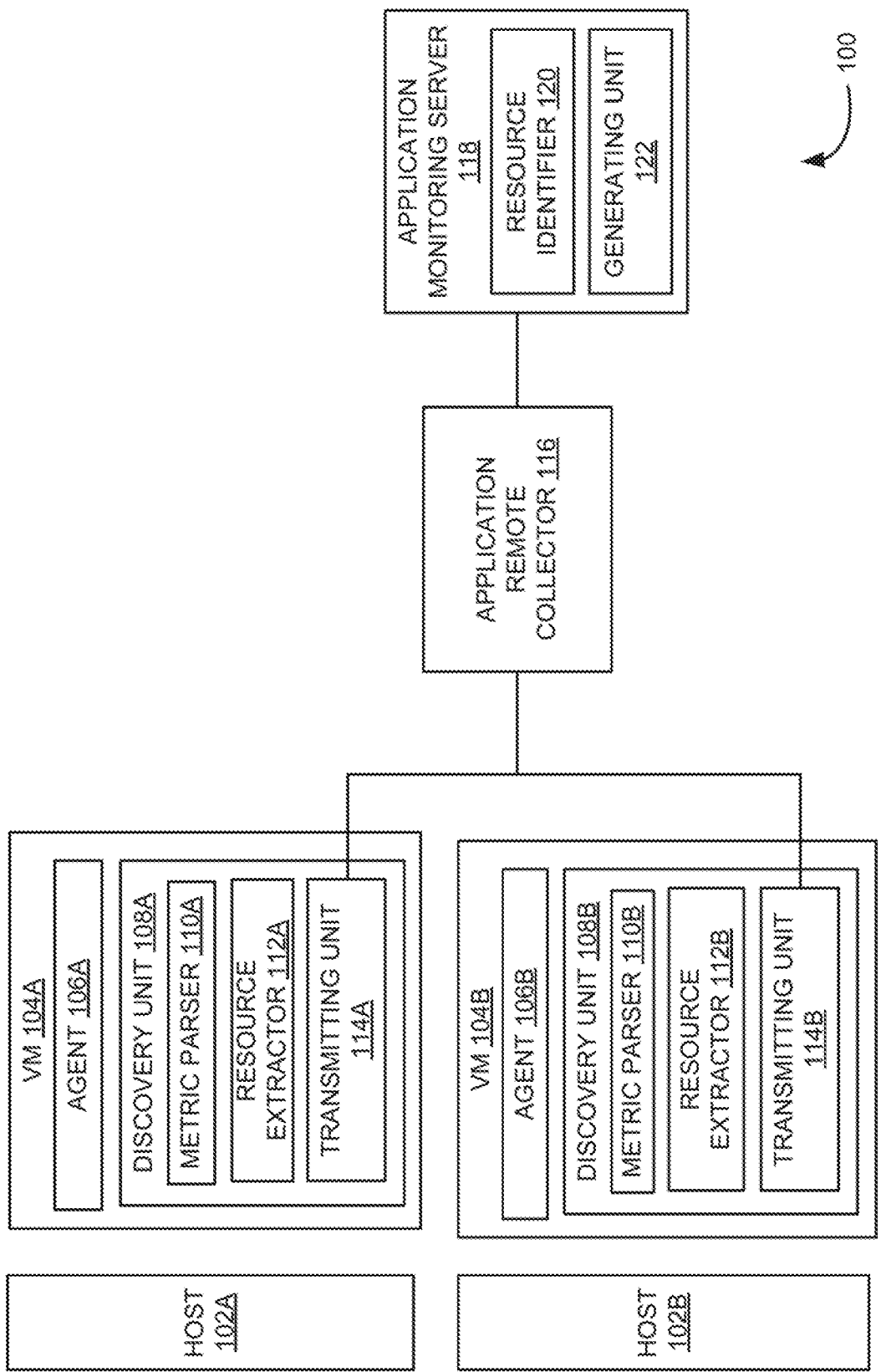
FIG. 1A is a block diagram of an example computing environment, depicting an endpoint having a discovery unit to determine application resources associated with an application running in the endpoint.

The drawings described herein are for illustration purposes only and are not intended to limit the scope of the present subject matter in any way.

DETAILED DESCRIPTION

Examples described herein may provide an enhanced computer-based and/or network-based method, technique, and system to determine application resources based on performance metrics of an application in a computing environment. Computing environment may be a physical computing environment (e.g. an on-premise enterprise computing environment or a physical data center) and/or virtual computing environment (e.g., a cloud computing environment, a virtualized environment, and the like).

The virtual computing environment may be a pool or collection of cloud infrastructure resources designed for enterprise needs. The resources may be a processor (e.g., central processing unit (CPU)), memory (e.g., random-access memory (RAM)), storage (e.g., disk space), and networking (e.g., bandwidth). Further, the virtual computing environment may be a virtual representation of the physical data center, complete with servers, storage clusters, and networking components, all of which may reside in virtual space being hosted by one or more physical data centers. Example virtual computing environment may include different endpoints (e.g., physical computers, virtual machines, and/or containers). For example, the computing environment may include multiple application hosts (i.e., physical computers) executing different workloads such as virtual machines, containers, and the like running therein. Example endpoints may execute different types of applications.

Further, performance monitoring of such applications has become increasingly important because application monitoring may aid in troubleshooting (e.g., to rectify abnormalities or shortcomings, if any) the applications. Application monitoring may be referred as application performance monitoring (APM) and/or application performance management (APM). Example performance monitoring tool or application or platform (e.g., VMware® vRealize Operations (vROps), Vmware Wavefront™, and the like) may receive performance metrics associated with applications from agents running in the endpoints. Further, the performance monitoring platform may display the performance metrics in a form of dashboards, for instance.

In some examples, the agents (e.g., Telegraf™) running in the endpoints may collect the performance metrics. However, the agents may not perform any function on the collected performance metrics to determine resources associated with the application. On the other hand, the performance monitoring platform may see value add in discovering and displaying the application resources and their relationships on the dashboards. For example, in the case of 'Tomcat Server', the performance monitoring platform may have to analyse the performance metrics to detect and represent the 'Tomcat Server' specific resources such as 'request processors', 'web modules', and the like. However, the performance monitoring platform may have to perform significant computation when the computing environment become more complex (e.g., as number of endpoints and corresponding applications increases). Hence, it may be challenging for the performance monitoring platform to derive the application resources and their relationships.

In some other examples, specialized agents may be developed to collect and analyse the performance metrics to determine the application resources. Example specialized agents may discover application specific resources and their relationships in a desired model and send to the performance monitoring platform for presenting. However, cost and effort in developing such specialized agents may be significantly high. Further, such discovered resources in the particular model from the specialized agents may not be consumed by more than one type of performance monitoring platform as different performance monitoring platforms may require different resource models and hierarchies. For example, vROps may consume the analysed data in a format different than Wavefront. Also, any change in a resource model and hierarchy in the applications may require upgrading the specialized agent at the endpoint.

Examples described herein may provide a distributed approach to determine application resources based on performance metrics. Examples described herein may provide a discovery unit in an endpoint. In one example, discovery unit may include a metric parser to receive the performance metrics associated with a program running in the endpoint and parse the received performance metrics. Example received performance metrics may be in a source format. Further, the discovery unit may include a resource extractor to apply a transformation definition to the parsed performance metrics to determine a plurality of resources in a destination format. Furthermore, the discovery unit may transmit the performance metrics and first information associated with the plurality of resources to an application monitoring server via a network. Example plurality of resources may be associated with an application being executed in the endpoint. Thus, examples described herein may reduce load on a central application monitoring server as the application resource discovery is performed at the endpoints.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described is included in at least that one example, but not necessarily in other examples.

System Overview and Examples of Operation

FIG. 1A is a block diagram of an example computing environment 100, depicting an endpoint (e.g., VM 104A) having a discovery unit 108A to determine application resources associated with an application running in endpoint 104A. Example computing environment 100 may be a cloud computing environment. For example, cloud computing environment 100 may be VMware vSphere®. Cloud computing environment 100 (e.g., a virtualized cloud computing environment) may include one or more computing platforms that support the creation, deployment, and management of virtual machine-based cloud applications.

Example cloud computing environment 100 may include multiple host computing systems (e.g., 102A and 102B), each executing corresponding ones of workloads (e.g., virtual machines 104A and 104B, containers, and the like). Example host computing system (e.g., 102A and 102B) may be a physical computer. The physical computer may be a hardware-based device (e.g., a personal computer, a laptop, or the like) including an operating system (OS). A virtual machine (e.g., 104A and 104B) may operate with its own guest OS on the physical computer using resources of the physical computer virtualized by virtualization software (e.g., a hypervisor, a virtual machine monitor, and the like). A container may be a data computer node that runs on top of host operating system (e.g., 102A and 102B) without the need for the hypervisor or separate operating system.

In the below described examples, virtual machines 104A and 104B may be considered as the endpoints executing multiple applications. However, a container or a physical machine may also be considered as an endpoint executing the applications. An application, also referred to as an application program or application software, may be a computer software package that performs a specific function directly for an end user or, in some cases, for another application. Examples of applications may include word processors, database programs, web browsers, development tools, image editors, communication platforms, and the like.

Further, endpoints 104A and 104B may include corresponding agents 106A and 106B. For example, agents 106A and 106B may real-time monitor endpoints 104A and 104B, respectively, to collect the performance metrics associated with respective programs. Example program may include an operating system and/or the application running in corresponding endpoints 104A and 104B. For example, agents 106A and 106B may be Telegraf agents. Telegraf agent may include input and output plugins. Input plugins may be responsible for collecting the performance metrics from underlying applications and operating system running on endpoints 104A and 104B. Further, there may be numerous input plugins available in Telegraf such as My Structured Query Language (MySQL), Postgres, SharePoint, and the like.

Furthermore, endpoints 104A and 104B may include discovery units 108A and 108B, respectively. As shown in FIG. 1A, discovery units 108A and 108B may include corresponding metric parsers (e.g., 110A and 110B), resource extractors (e.g., 112A and 112B), and transmitting units (e.g., 114A and 114B). In one example, metric parser 110A may receive the performance metrics associated with endpoint 104A in a source format. For example, the source format may be a Wavefront format, InfluxDB format, MQ Telemetry Transport (MQTT) format, Advanced Message Queuing Protocol (AMQP) format, or the like.

Resource extractor 112A may apply a transformation definition to the parsed performance metrics to determine a plurality of resources in a destination format. For example, each of the plurality of resources may be associated with corresponding applications being executed in endpoint 104A. Example destination format may be compatible to a target application running in an application monitoring server 118. For example, the target application may include a performance monitoring application such as vROps, Wavefront, and the like. Further, resource extractor 112A may apply the transformation definition to the parsed performance metrics to determine hierarchical relationships between the plurality of resources.

Transmitting unit 114A may transmit the performance metrics and first information associated with the plurality of resources to application monitoring server 118 via a network. Also, transmitting unit 114A may transmit the performance metrics, the first information, and second information associated with the hierarchical relationships to application monitoring server 118 via the network. Example network can be a managed Internet protocol (IP) network administered by a service provider. For example, the network may be implemented using wireless protocols and technologies, such as WiFi, WiMax, and the like. In other examples, the network can also be a packet-switched network such as a local area network, wide area network, metropolitan area network, Internet network, or other similar type of network environment. In yet other examples, the network may be a fixed wireless network, a wireless local area network (LAN), a wireless wide area network (WAN), a personal area network (PAN), a virtual private network (VPN), intranet or other suitable network system and includes equipment for receiving and transmitting signals. Example metric parser 110A, resource extractor 112A, and transmitting unit 114A may be described in FIG. 1B.

As shown in FIG. 1A, cloud computing environment 100 may include an application remote collector 116 to collect the performance metrics, the first information, and the second information associated with the plurality of resources from transmitting unit 114A. Further, application remote collector 116 may transmit the performance metrics, the first information, and the second information associated with the plurality of resources to application monitoring server 118 via the network. In one example, application remote collector 116 may be implemented in a computing device that is connected external to application monitoring server 118 or may be implemented as a part of application monitoring server 118.

Further, cloud computing environment 100 may include application monitoring server 118. Application monitoring server 118 may include a resource identifier 120 and a generating unit 122. In one example, resource identifier 120 may receive the performance metrics including the first information and the second information from application remote collector 116. In another example, resource identifier 120 may receive the performance metrics including the first information and the second information from endpoint 104A via the network. Further, resource identifier 120 may extract the first information and the second information from the performance metrics. Furthermore, application monitoring server 118 may present the first information and the second information associated with the plurality of resources on a graphical user interface.

In some examples, generating unit 122 may retrieve historical performance metrics of applications running in endpoints 104A and 104B corresponding to a predefined period. Further, generating unit 122 may generate transformation rules to determine the plurality of resources corresponding to the applications by analyzing the historical performance metrics. Furthermore, generating unit 122 may generate the transformation definition based on the transformation rules in a transformation definition language. Example application monitoring server 118 may transmit the transformation definition to endpoints 104A and 104B. Further, generating unit 122 may determine a change in the plurality of resources corresponding to the applications and update the transformation rules and the corresponding transformation definition. Then, application monitoring server 118 may propagate the updated transformation definition to endpoints 104A and 104B. Example generation of the transformation definition is described in FIG. 3.

FIG. 1B is a block diagram of example discovery unit 108A of FIG. 1A, depicting additional features. For example, similarly named elements of FIG. 1B may be similar in structure and/or function to elements described with respect to FIG. 1A. As shown in FIG. 1B, discovery unit 108A may be communicatively connected to a repository 152. In one example, repository 152 may receive the transformation definition from application monitoring server 118 and store a template including the transformation definition. Example transformation definition may provide knowledge of determining the plurality of resources associated with the application in the destination format. For example, the destination format may be compatible to the target application (e.g., vROps, Wavefront, and the like). In other words, discovery unit 108A may have no knowledge about any application or corresponding resources. Thus, the knowledge may be declared in the transformation definition and provided as another input to discovery unit 108A. In one example, the transformation definition may be configured declaratively (e.g., via Extensible Markup Language (XML)) as described in FIG. 3.

As shown in FIG. 1B, discovery unit 108A may include metric parser 110A to receive the performance metrics associated with an endpoint 104A. Example performance metrics may be in a source format (e.g., Wavefront format). For example, metric parser 110A may receive the performance metrics associated with 'Microsoft® Structured Query Language (SQL) Server®' from the Telegraf agent, which may be in Wavefront format.

FIG. 2A shows example performance metrics 200A in Wavefront format, in accordance with examples described herein. FIG. 2B shows example performance metrics 200B in JavaScript Object Notation (JSON) format, in accordance with examples described herein. The performance metrics may include metrics that may measure the performance of various aspects of the application. In the performance metrics shown in FIGS. 2A and 2B, the raw performance metrics may not provide a list of resources, explicitly. However, the performance metrics may include metrics such as reads/sec (e.g., 202A of FIG. 2A and 202B of FIG. 2B), writes/sec (e.g., 204A of FIG. 2A and 204B of FIG. 2B), and the like for each resource as shown in FIGS. 2A and 2B.

Further, metric parser 110A may parse the received performance metrics. In one example, metric parser 110A may parse the performance metrics to extract relevant information from the performance metrics. For example, metric parser 110A may parse the performance metrics depicted in FIGS. 2A and 2B to index (e.g., metric name, value, time stamp, source tag, point tag, and the like) the performance metrics as depicted in Table 1:

TABLE 1

| | |
|---|---|
| Metric Name | MSSQL.Rows-write-sec-.tempdb |
| Value | 3000 |
| Time Stamp | 1528808928 |
| Source Tag | serverName="WIN-MSSQL" |
| Point Tag | type="DatabaseIO" source="my_win_2016" vc_uuid="419d2d2b-7c45-4ac1-9df9-345778584d48" vm_mor="vm-46" |

Thus, metric parser 110A may parse the performance metrics to omit irrelevant data such as the point tags and timestamp as they may not have significance in the context of determining the application resources.

Further, resource extractor 112A may apply the transformation definition to the parsed performance metrics to determine a plurality of resources in a destination format. For example, the plurality of resources may be associated with an application being executed in endpoint 104A. In one example, resource extractor 112A may apply transformation rules defined in the transformation definition to the parsed performance metrics to determine the plurality of resources in the destination format that may be compatible to the target application. In another example, resource extractor 112A may apply the transformation definition to the parsed performance metrics to determine hierarchical relationships between the plurality of resources in the destination format.

FIG. 2C shows example transformation definition 200C, in accordance with examples described herein. For example, transformation definition 200C may be represented in a transformation definition language. Example transformation definition language may be an Extensible Markup Language (XML)-based transformation definition language. Example transformation definition 200C depicted in FIG. 2C may illustrate:

a. There may be only one instance of the MSSQL-SERVERINSTANCE resource created for each instance of SQL Server (e.g., as shown as 206 of FIG. 2C).
b. For each instance of MSSQLSERVERINSTANCE, there could be multiple instance of DATABASE resource and the instances are enumerated/discovered using a metric search policy by matching a part of the metric name and extracting the database name using the NAME_MATCHER pattern.
c. The writes/sec metric may be present for database resources and hence, the number of times writes/sec metric appears in the collected data may indicate the number of DATABASEs present. Further, the name of the database may be the trailing suffix after the common suffix in the metric name "MSSQL.Rows--write-sec-".
d. The DATABASE resource may have two metrics reads/sec (e.g., 208 of FIG. 2C) and writes/sec (e.g., 210 of FIG. 2C) and they would have the prefix "MSSQL.Rows--write-sec-" and "MSSQL.Rows--read-sec-", respectively followed by the database name.

Further, resource extractor 112A may generate a plurality of tags including the first information. In this example, each tag may be associated with a resource of the plurality of resources and may include information associated with the resource. Furthermore, resource extractor 112A may assign the plurality of tags to the performance metrics. FIG. 2D shows example performance metrics 200A of FIG. 2A with the plurality of tags including the first information (e.g., 212 of FIG. 2D). Also, resource extractor 112A may generate a plurality of tags including the second information. In this example, each tag may provide a hierarchical relationship between at least two resources of the plurality of resources. FIG. 2E shows example performance metrics 200A of FIG. 2A with the plurality of tags including the second information (e.g., 214 of FIG. 2E).

For example, when transformation definition 200C is run against the parsed performance metrics, resource extractor 112A may produce output of performance metrics 200D and 200E with tags including the first information and the second information as shown in FIGS. 2D and 2E, respectively. As shown in FIGS. 2D and 2E, the plurality of tags may be added to performance metrics 200A of FIG. 2A. For example, "resoureID" tag may associate a performance metric to a resource. Further, the resources may be represented in the same format with "ResourceKind" and "instanceName" tags that define the resource. Also, "resoureID" tag may be used for associating the resources to the performance metrics and their child resources. For example, "parentResourceID" tag of the resource may be associated with a parent resource.

In one example, the transformations performed using transformation definition 200C may not depend on the input data format. For example, transformation definition 200C may be applied on performance metrics 200A (e.g., Wavefront format) as well as performance metrics 200B (JSON format) that Telegraf output plugin support. Further, resource extractor 112A may support output plugin formats such as InfluxDB, MQTT, AMQP, Kafka, and the like. Further, transmitting unit 114A may transmit performance metrics 200D and 200E including the first information (e.g., 200D) associated with the plurality of resources and the second information associated (e.g., 200E) with the hierarchical relationships to application monitoring server 118 via the network. Thus, examples described herein may provide discovery unit 108A that ingests raw performance metrics coming in any output plugin format (e.g., Wavefront, InfluxDB, and the like) from the agent (e.g., Telegraf) and outputs the performance metrics with tags describing discovered resource information and their relationships in a desired format.

Thus, example described herein may provide discovery unit 108A on each endpoint to perform resource discovery by consuming the performance metrics from agents running on corresponding endpoints. Hence, there may be no load on application monitoring server 118 even when the scale of computing environment 100 (e.g., number of endpoints and application) increases.

In some examples, the functionalities described in FIGS. 1A and 1B, in relation to instructions to implement functions of metric parser 110A, resource extractor 112A, transmitting unit 114A, resource identifier 120, generating unit 122 and any additional instructions described herein in relation to the storage medium, may be implemented as engines or modules comprising any combination of hardware and programming to implement the functionalities of the modules or engines described herein. The functions of metric parser 110A, resource extractor 112A, transmitting unit 114A, resource identifier 120, and generating unit 122 may also be implemented by a respective processor. In examples described herein, the processor may include, for example, one processor or multiple processors included in a single device or distributed across multiple devices. In some examples, application monitoring server 118 can be a part of management software (e.g., vROps and Wavefront that are offered by VMware®).

FIG. 3 illustrates an example representation 300 of the determined application resources associated with the application 302. For example, a 'Tomcat Server' (e.g., application 302) is considered. In one example, an application monitoring server (e.g., application monitoring server 118 of FIGS. 1A and 1B) may extract the resources, which may be determined by a respective endpoint (e.g., endpoint 104A of FIGS. 1A and 1B) associated with 'Tomcat Server' 302. Example resources (e.g., 304, 306, and 308) may include databases such as 'request processors' (e.g., 304) and 'web modules' (e.g., 306 and 308). Further, performance metrics associated to each resource may be presented. For example, the performance metrics of 'web module' (e.g., 306) is depicted as 310 in FIG. 3.

In the examples described herein, the resources such as databases and their hierarchical relationships are depicted. However, examples described herein may be implemented to determine other resources such as connectors, indices, clusters, and the like. Accordingly, the transformation definition may include necessary transformation rules to determine different kinds of resources.

Figure 4:
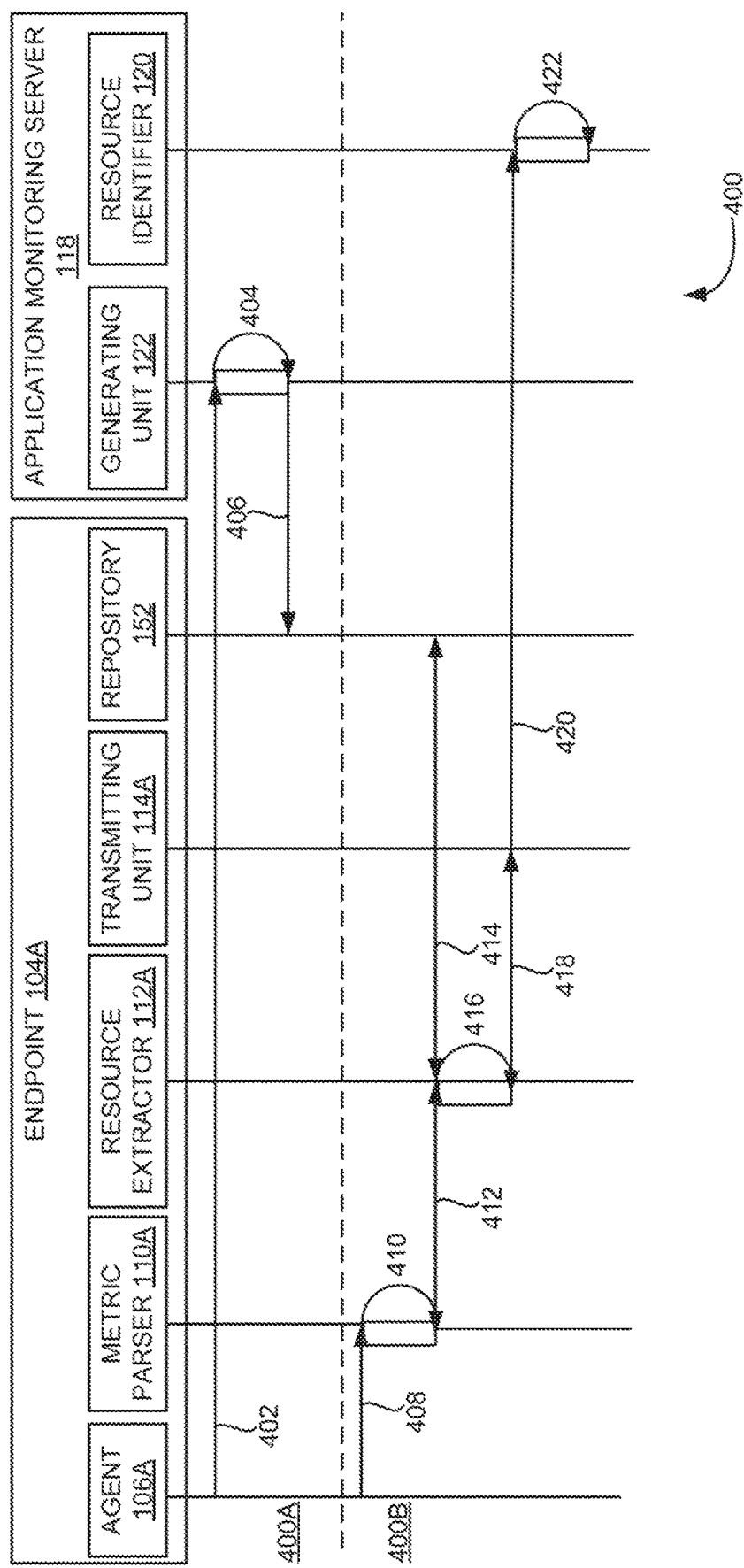
FIG. 4 is an example sequence diagram illustrating a sequence of events to determine application resources based on performance metrics of an application.

FIG. 4 is an example sequence diagram 400 illustrating a sequence of events to determine application resources based on performance metrics of an application. For example, similarly named elements of FIG. 4 may be similar in structure and/or function to elements described with respect to FIGS. 1A and 1B. The sequence diagram may represent the interactions and the operations involved in determining the application resources based on the performance metrics of the application. FIG. 4 illustrates process objects including objects corresponding to endpoint 104A such as agent 106A, metric parser 110A, resource extractor 112A, transmitting unit 114A, and repository 152 along with their respective vertical lines originating from them. Further, FIG. 4 illustrates process objects including objects corresponding to application monitoring server 118 such as generating unit 122 and resource identifier 120. The vertical lines of agent 106A, metric parser 110A, resource extractor 112A, transmitting unit 114A, repository 152, generating unit 122, and resource identifier 120 may represent the processes that may exist simultaneously. The horizontal arrows (e.g., 402, 406, 408, 412, 414, 418, and 420) may represent the data flow steps between the vertical lines originating from their respective process objects (e.g., agent 106A, metric parser 110A, resource extractor 112A, transmitting unit 114A, repository 152, generating unit 122, and resource identifier 120). Further, activation boxes (e.g., 404, 410, 416, and 422) between the horizontal arrows may represent the process that is being performed in the respective process object.

In one example, the sequence of events to determine the application resources may be segregated into design phase 400A (e.g., 402 to 406) and runtime phase 400B (408 to 422). During design phase 400A, transformation definition used to determine the application resources may be generated based on historical performance metrics. During runtime phase 400B, the application resources may be determined using the generated transformation definition.

At 402, generating unit 122 may retrieve historical performance metrics of applications running in endpoint 104A corresponding to a predefined period. Example historical performance metrics may be associated with an application running in endpoint 104A corresponding to the predefined period. In one example, generating unit 122 may retrieve the historical performance metrics from agent 106A as shown in FIG. 4. In another example, generating unit 122 may retrieve the historical performance metrics from a data repository, where the historical performance metrics are stored.

At 404, generating unit 122 may generate transformation rules to determine the plurality of resources corresponding to the applications by analyzing the historical performance metrics. Further, generating unit 122 may generate the transformation definition based on the transformation rules in a transformation definition language. At 406, generating unit 122 may store the transformation definition including the transformation rules in repository 152. Thus, the historical performance metrics may be collected for the predefined period corresponding to each application. Further, the historical performance metrics may be analyzed in detail to generate the transformation definition, which may be used to identify and discover resources corresponding to each application. In one example, the transformation definition may be generated once and may be updated based on modifications in the resources corresponding to the applications. For example, generating unit 122 may determine a change in the plurality of resources corresponding to the application. Further, generating unit 122 may update the transformation rules and the corresponding transformation definition. In one example, the transformation definition can be defined to cater to any format.

At 408, metric parser 110A may receive real-time performance metrics associated with the application from agent 106A. In one example, the performance metrics may be in a source format. At 410, metric parser 110A may parse the received performance metrics.

At 412, resource extractor 112A may receive the parsed performance metrics from metric parser 110A. At 414, resource extractor 112A may access the transformation definition from repository 152. At 416, resource extractor 112A may apply the transformation definition to the parsed performance metrics to determine a plurality of resources in a destination format. In one example, the plurality of resources may be associated with the application being executed in endpoint 104A. At 418, transmitting unit 114A may receive the performance metrics and first information associated with the plurality of resources. At 420, transmitting unit 114A may transmit the performance metrics and the first information associated with the plurality of resources to resource identifier 120 via a network.

In one example, at 416, resource extractor 112A may generate a plurality of tags including the first information, each tag is associated with a resource of the plurality of resources and includes information associated with the resource. Further, resource extractor 112A may assign the plurality of tags to the performance metrics. Furthermore, resource extractor 112A may transmit the performance metrics along with the assigned plurality of tags to resource identifier 120 of application monitoring server 118 via transmitting unit 114A.

At 422, resource identifier 120 may extract the first information associated with the plurality of resources using the plurality of tags. Further, resource identifier 120 may present the first information associated with the plurality of resources on a graphical user interface.

In another example, resource extractor 112A may apply the transformation definition to the parsed performance metrics to determine hierarchical relationships between the plurality of resources in the destination format, at 416. Further, transmitting unit 114A may receive the performance metrics, the first information, and second information associated with the hierarchical relationships, at 418. At 420, transmitting unit 114A may transmit the performance metrics, the first information, and second information associated with the hierarchical relationships to resource identifier 120 via the network. Thus, examples described herein may add extra information in the performance metrics at endpoint 104A based on the transformation definition, which can be used by subscribers to resource discovery generically without modifying an output plugin code itself and breaking existing consumers flow.

In one example, example sequence diagram 400 may include an application remote collector (e.g., application remote collector 116) in communication with endpoint 104A and application monitoring server 118. Example application remote collector 116 may collect the performance metrics and the first information associated with the plurality of resources, in runtime, for monitoring and troubleshooting the endpoint. Further, application remote collector 116 may transmit the performance metrics and the first information associated with the plurality of resources to application monitoring server 118.

Thus, an agent running in an endpoint may collect performance metrics and pass on the performance metrics to output plugins. The output plugins may have the information about a format in which the data need to be sent along with destination. Example Wavefront output plugin may convert the data into the Wavefront format and send to an application remote collector (ARC) message queue. Further, the application remote collector message queue may be subscribed by multiple subscribers, who can choose to ignore information, available as part of message tags, if they are not interested in. For example, if the application remote collector queue is subscribed by Wavefront and vRops, and the performance metrics includes information like "resourceID" and "parentResourceID" in form of tags which is not useful for Wavefront, then the Wavefront may choose to ignore and vRops may use the information as the information may facilitate vRops to do resource discovery and build the relationship (e.g., parent and children resources).

EXAMPLE PROCESSES

Figure 5:
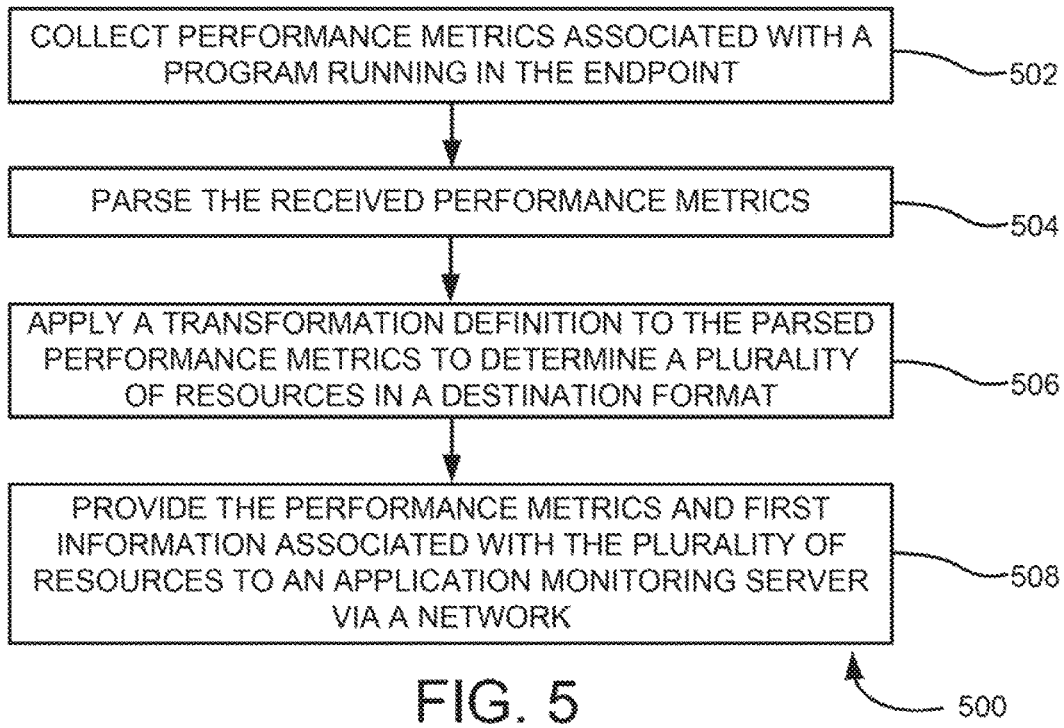
FIG. 5 is an example flow diagram illustrating determining application resources based on performance metrics of an application running in an endpoint.

FIG. 5 is an example flow diagram 500 illustrating determining application resources based on performance metrics of an application running in an endpoint. It should be understood that the process depicted in FIG. 5 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 502, the performance metrics associated with a program running in an endpoint may be collected. Example performance metrics may be in a source format. In one example, the program may include an operating system and/or the application running in the endpoint. Further, the performance metrics may be collected by an agent running in the endpoint. The performance metrics may include at least one of application metrics and operating system metrics. For example, the performance metrics may include performance metric values associated with at least one of central processing unit (CPU), memory, storage, graphics, and network traffic. At 504, the received performance metrics may be parsed.

At 506, a transformation definition may be applied to the parsed performance metrics to determine a plurality of resources in a destination format. Example plurality of resources may be associated with an application being executed in the endpoint. In one example, applying the transformation definition may include applying transformation rules defined in the transformation definition to the parsed performance metrics to determine the plurality of resources in the destination format that is compatible to a target application. Example transformation rules may be defined in a transformation definition language. For example, the transformation definition language may be, but not limited to, an XML-based transformation definition language.

At 508, the performance metrics and first information associated with the plurality of resources may be transmitted to an application monitoring server via a network. In one example, transmitting the performance metrics may include generating a plurality of tags including the first information. Each tag may be associated with a resource of the plurality of resources and includes information associated with the resource. Further, the plurality of tags may be assigned to the performance metrics. Furthermore, the performance metrics along with the assigned plurality of tags may be transmitted to the application monitoring server.

In one example, at the application monitoring server, the first information associated with the plurality of resources may be extracted using the plurality of tags. Further, the first information associated with the plurality of resources may be presented on a graphical user interface.

In one example, applying the transformation definition may further includes applying the transformation definition to the parsed performance metrics to determine hierarchical relationships between the plurality of resources in the destination format. Further, the performance metrics, the first information, and second information associated with the hierarchical relationships may be transmitted to the application monitoring server via the network.

In this example, at the application monitoring server, the first information associated with the plurality of resources and the second information associated with the hierarchical relationships may be extracted using the plurality of tags. Further, the first information and the second information may be presented on the graphical user interface.

In one example, the transformation definition used to determine the plurality of resources may be stored in a repository prior to executing the steps of 502-508. Generating the transformation definition may include retrieving historical performance metrics corresponding to a pre-defined period. Further, transformation rules may be generated to determine the plurality of resources corresponding to the application using the historical performance metrics. Furthermore, the transformation definition may be defined to include the transformation rules in a transformation definition language. In one example, a change in the plurality of resources corresponding to the application may be determined. Upon determining the change, the transformation rules and the corresponding transformation definition may be updated.

In one example, the transformation definition may be generated by the application monitoring server and provided to the endpoint upon storing in the repository. Thus, example described herein may provide a distributed mechanism to determine application specific resources from the performance metrics in a generalized manner.

Figure 6:
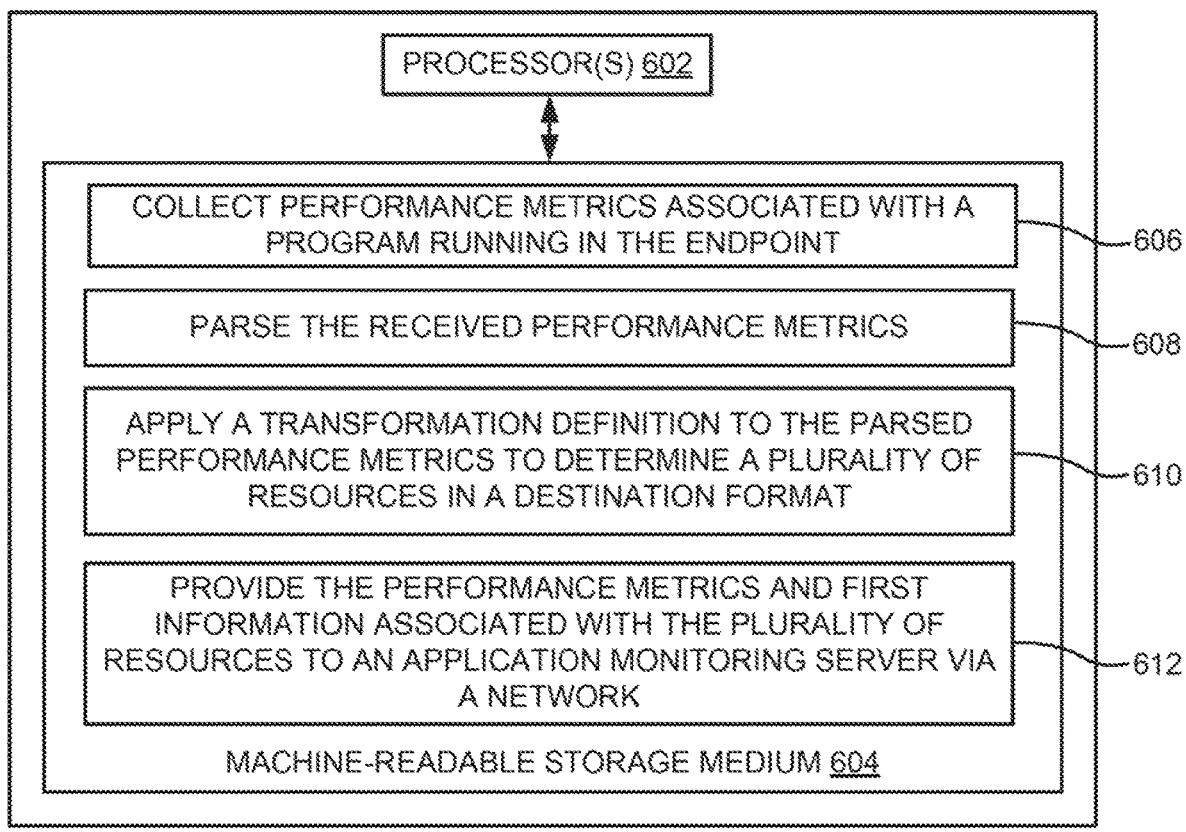
FIG. 6 is a block diagram of an example computing device including non-transitory computer-readable storage medium storing instructions to determine application resources based on performance metrics of an application.

FIG. 6 is a block diagram of an example computing device 600 including non-transitory computer-readable storage medium 604 storing instructions to determine application resources based on performance metrics of an application. Computing device 600 may include a processor 602 and machine-readable storage medium 604 communicatively coupled through a system bus. Processor 602 may be any type of central processing unit (CPU), microprocessor, or processing logic that interprets and executes machine-readable instructions stored in machine-readable storage medium 604. Machine-readable storage medium 604 may be a random-access memory (RAM) or another type of dynamic storage device that may store information and machine-readable instructions that may be executed by processor 602. For example, machine-readable storage medium 604 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 604 may be a non-transitory machine-readable medium. In an example, machine-readable storage medium 604 may be remote but accessible to computing system 600.

Machine-readable storage medium 604 may store instructions 606-612. In an example, instructions 606-612 may be executed by processor 602 to determine application resources based on performance metrics of an application. Instructions 606 may be executed by processor 602 to collect the performance metrics associated with a program running in an endpoint. In one example, the program may include an operating system and/or the application running in the endpoint. Example performance metrics may be in a source format. In one example, the performance metrics may be published by an agent running in the endpoint. Example performance metrics may include at least one of application metrics and operating system metrics associated with the plurality of endpoints. For example, the performance metrics may include performance metric values associated with at least one of central processing unit (CPU), memory, storage, graphics, and network traffic.

Instructions 608 may be executed by processor 602 to parse the received performance metrics. Instructions 610 may be executed by processor 602 to apply a transformation definition to the parsed performance metrics to determine a plurality of resources in a destination format. In one example, the plurality of resources may be associated with an application being executed in the endpoint.

Instructions 612 may be executed by processor 602 to provide the performance metrics and first information associated with the plurality of resources to an application monitoring server via a network. In one example, instructions 612 to provide the performance metrics may include instructions to generate a plurality of tags including the first information. Each tag may be associated with a resource of the plurality of resources and includes information associated with the resource. Further, the instructions may assign the plurality of tags to the performance metrics. Furthermore, the instructions may provide the performance metrics along with the assigned plurality of tags to the application monitoring server.

Further, instructions may be executed by processor 602 to apply the transformation definition to the parsed performance metrics to determine hierarchical relationships between the plurality of resources in the destination format. Furthermore, instructions may be executed by processor 602 to provide the performance metrics, the first information, and second information associated with the hierarchical relationships to the application monitoring server via the network.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A system comprising:
an application monitoring server; and
an endpoint in communication with the application monitoring server, the endpoint comprising:
an agent to collect performance metrics associated with a program running in the endpoint; and
a discovery unit in communication with the agent, the discovery unit comprising:
a metric parser to:
receive the performance metrics in a source format; and
parse the received performance metrics;
a resource extractor to:
apply a transformation definition to the parsed performance metrics to determine a plurality of resources in a destination format, wherein the plurality of resources is associated with an application being executed in the endpoint; and
a transmitting unit to:
transmit the performance metrics and first information associated with the plurality of resources to the application monitoring server via a network.

2. The system of claim 1, wherein the resource extractor is to:
apply the transformation definition to the parsed performance metrics to determine hierarchical relationships between the plurality of resources in the destination format, and wherein the transmitting unit is to:
transmit the performance metrics, the first information, and second information associated with the hierarchical relationships to the application monitoring server via the network.

3. The system of claim 1, wherein the agent is to:
real-time monitor the endpoint to collect the performance metrics associated with the program, wherein the program comprises an operating system and/or the application running in the endpoint.

4. The system of claim 1, wherein the resource extractor is to:
generate a plurality of tags including the first information, each tag is associated with a resource of the plurality of resources and includes information associated with the resource;
assign the plurality of tags to the performance metrics; and
transmit the performance metrics along with the assigned plurality of tags to the application monitoring server via the transmitting unit.

5. The system of claim 4, wherein the application monitoring server comprises a resource identifier to:
extract the first information associated with the plurality of resources using the plurality of tags; and
present the first information associated with the plurality of resources on a graphical user interface.

6. The system of claim 1, further comprising:
an application remote collector in communication with the endpoint and the application monitoring server to:
collect the performance metrics and the first information associated with the plurality of resources, in runtime, for monitoring and troubleshooting the endpoint; and
transmit the performance metrics and the first information associated with the plurality of resources to the application monitoring server.

7. The system of claim 1, further comprising:
a repository in communication with the endpoint to store a template including the transformation definition, wherein the transformation definition provides knowledge of determining the plurality of resources associated with the application in the destination format, and wherein the destination format is compatible to a target application.

8. The system of claim 1, wherein the resource extractor is to:
apply transformation rules defined in the transformation definition to the parsed performance metrics to determine the plurality of resources in the destination format that is compatible to a target application.

9. The system of claim 1, wherein the application monitoring server comprises a generating unit to:
retrieve historical performance metrics of applications running in the endpoint corresponding to a predefined period;
generate transformation rules to determine the plurality of resources corresponding to the applications by analyzing the historical performance metrics; and
generate the transformation definition based on the transformation rules in a transformation definition language.

10. The system of claim 9, wherein the generating unit is to:
determine a change in the plurality of resources corresponding to the application; and
update the transformation rules and the corresponding transformation definition.

11. The system of claim 1, wherein the endpoint comprises one of a virtual machine, a container, and a physical machine.

12. A computer implemented method comprising:
collecting performance metrics associated with a program running in an endpoint, wherein the performance metrics are in a source format;
parsing the received performance metrics;
applying a transformation definition to the parsed performance metrics to determine a plurality of resources in a destination format, wherein the plurality of resources is associated with an application being executed in the endpoint; and
transmitting the performance metrics and first information associated with the plurality of resources to an application monitoring server via a network.

13. The computer implemented method of claim 12, wherein applying the transformation definition further comprises:
applying the transformation definition to the parsed performance metrics to determine hierarchical relationships between the plurality of resources in the destination format; and
transmitting the performance metrics, the first information, and second information associated with the hierarchical relationships to the application monitoring server via the network.

14. The computer implemented method of claim 12, wherein the program comprises an operating system and/or the application running in the endpoint.

15. The computer implemented method of claim 12, wherein the performance metrics are collected by an agent running in the endpoint, the performance metrics comprise performance metric values associated with at least one of central processing unit (CPU), memory, storage, graphics, and network traffic.

16. The computer implemented method of claim 12, wherein transmitting the performance metrics comprises:
generating a plurality of tags including the first information, each tag is associated with a resource of the plurality of resources and includes information associated with the resource;
assigning the plurality of tags to the performance metrics; and
transmitting the performance metrics along with the assigned plurality of tags to the application monitoring server.

17. The computer implemented method of claim 16, further comprising:
extracting the first information associated with the plurality of resources using the plurality of tags; and
presenting the first information associated with the plurality of resources on a graphical user interface.

18. The computer implemented method of claim 12, further comprising:
retrieving historical performance metrics corresponding to a predefined period;
generating transformation rules to determine the plurality of resources corresponding to the application by analyzing the historical performance metrics; and
defining the transformation definition to include the transformation rules in a transformation definition language.

19. The computer implemented method of claim 18, wherein the transformation rules are defined in a transformation definition language, and wherein the transformation definition language is an XML-based transformation definition language.

20. The computer implemented method of claim 18, further comprising:

determining a change in the plurality of resources corresponding to the application; and updating the transformation rules and the corresponding transformation definition.

21. A non-transitory machine-readable storage medium encoded with instructions that, when executed a computer, cause the computer to:

collect performance metrics associated with a program running in an endpoint, wherein the performance metrics are in a source format;

parse the received performance metrics;

apply a transformation definition to the parsed performance metrics to determine a plurality of resources in a destination format, wherein the plurality of resources is associated with an application being executed in the endpoint; and provide the performance metrics and first information associated with the plurality of resources to an application monitoring server via a network.

22. The non-transitory machine-readable storage medium of claim 21, wherein instructions to apply the transformation definition further comprise instructions to:

apply the transformation definition to the parsed performance metrics to determine hierarchical relationships between the plurality of resources in the destination format; and provide the performance metrics, the first information, and second information associated with the hierarchical relationships to the application monitoring server via the network.

23. The non-transitory machine-readable storage medium of claim 21, wherein the program comprises an operating system and/or the application running in the endpoint.

24. The non-transitory machine-readable storage medium of claim 21, wherein the performance metrics are published by an agent running in the endpoint, the performance metrics comprise performance metric values associated with at least one of central processing unit (CPU), memory, storage, graphics, and network traffic.

25. The non-transitory machine-readable storage medium of claim 21, wherein instructions to provide the performance metrics comprise instructions to:

generate a plurality of tags including the first information, each tag is associated with a resource of the plurality of resources and includes information associated with the resource;

assign the plurality of tags to the performance metrics; and provide the performance metrics along with the assigned plurality of tags to the application monitoring server.

* * * * *